United States Patent [19]

Murphy

[11] Patent Number: 5,586,461
[45] Date of Patent: Dec. 24, 1996

[54] METHODS AND APPARATUS FOR MANUFACTURING HELICAL PRODUCTS

[75] Inventor: Maurice W. Murphy, Lawrenceville, Ga.

[73] Assignee: The Morgan Crucible Company plc, Windsor, England

[21] Appl. No.: 334,136

[22] Filed: Nov. 4, 1994

[51] Int. Cl.[6] .............................. B21F 35/02; B21F 3/02
[52] U.S. Cl. .................... 72/137; 72/145; 72/135
[58] Field of Search ..................... 72/135, 136, 143, 72/145, 166, 173, 137, 138; 29/173; 492/35

[56] References Cited

U.S. PATENT DOCUMENTS

| | | |
|---|---|---|
| 1,914,976 | 6/1933 | Nigro et al. . |
| 2,192,260 | 3/1940 | Fisher et al. ............................. 72/138 |
| 2,888,726 | 6/1959 | Smith . |
| 2,912,816 | 11/1959 | Kitselman . |
| 3,018,319 | 1/1962 | Quayle . |
| 3,183,658 | 5/1965 | Peterson . |
| 3,195,338 | 7/1965 | Bram ........................................ 72/145 |
| 3,315,509 | 4/1967 | Barlow ..................................... 72/145 |
| 3,646,793 | 3/1972 | Teraoka .................................... 72/137 |
| 3,800,397 | 4/1974 | Poffenberger . |
| 3,847,491 | 11/1974 | Poffenberger . |
| 4,546,631 | 10/1985 | Eisinger .................................... 72/135 |
| 5,105,642 | 4/1992 | Mohr ........................................ 72/137 |

FOREIGN PATENT DOCUMENTS

42334/72  4/1973  Australia .
706920  7/1931  France .

Primary Examiner—Lowell A. Larson
Assistant Examiner—Rodney Butler
Attorney, Agent, or Firm—Dean W. Russell; Kilpatrick & Cody

[57] ABSTRACT

Methods and apparatus for forming devices including dead-ends and insulator ties from flat and other strips of material, as well as the devices themselves, are disclosed. Components of these devices may be formed continuously from a single strip, avoiding the need to weld or clamp the components together. Forming the devices in this manner reduces the possibility of stresses or non-uniformities forming when the components are joined and permits continuous automatic or semiautomatic manufacture to occur.

6 Claims, 4 Drawing Sheets

SECTION A-A

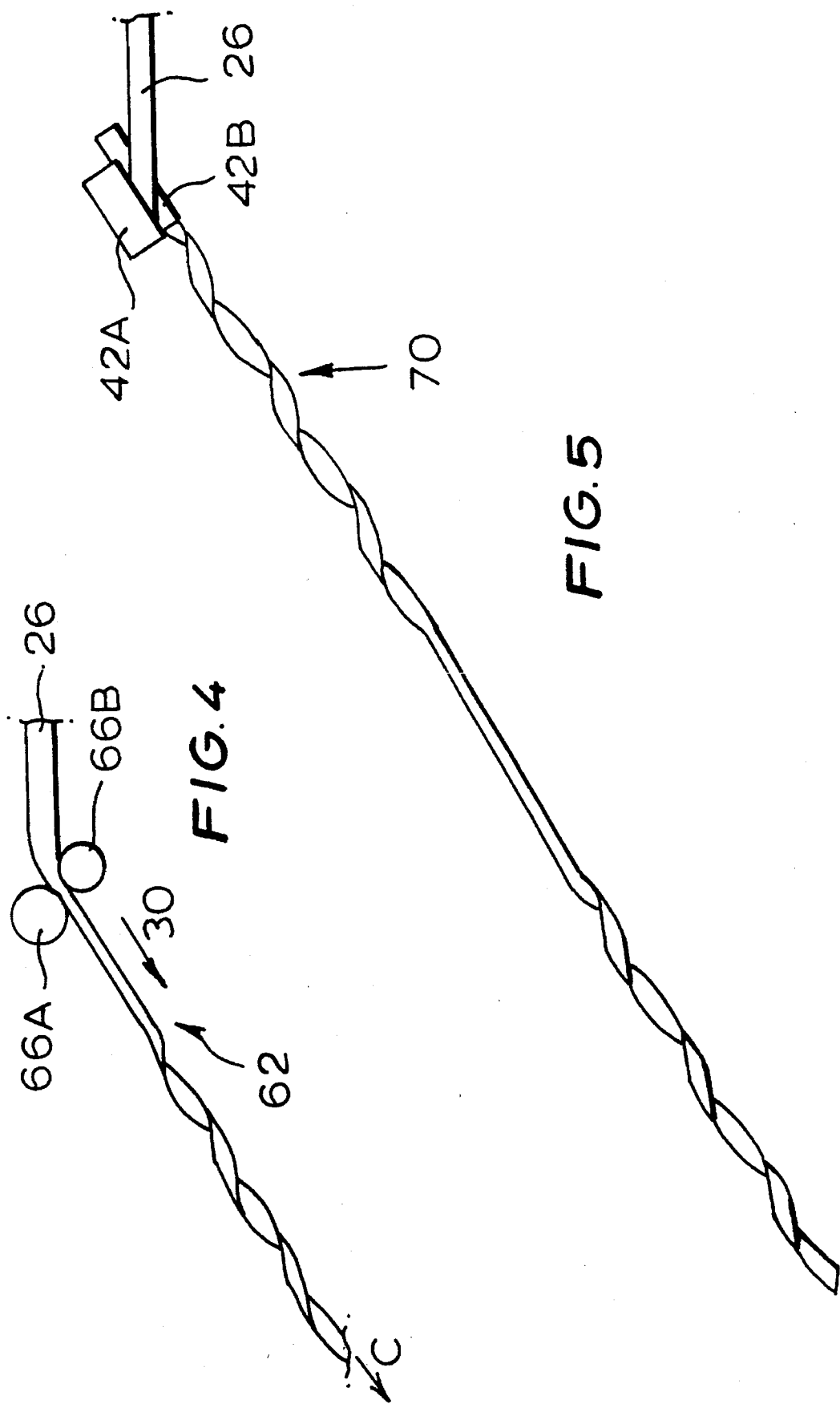

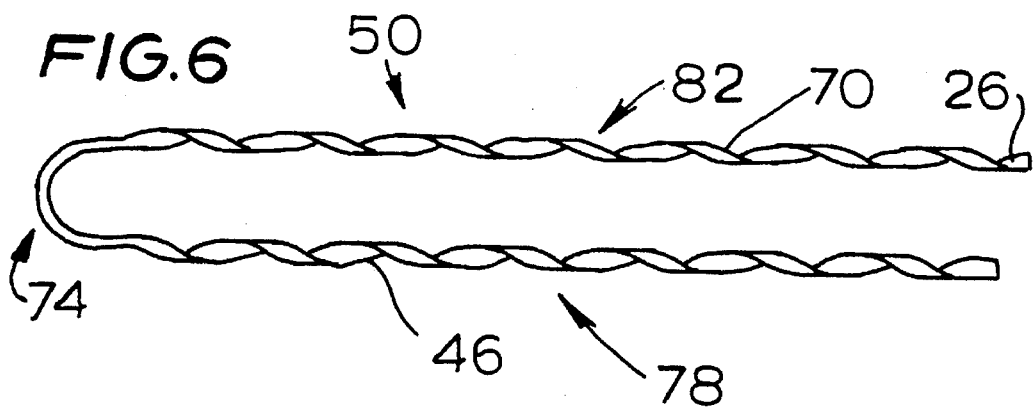
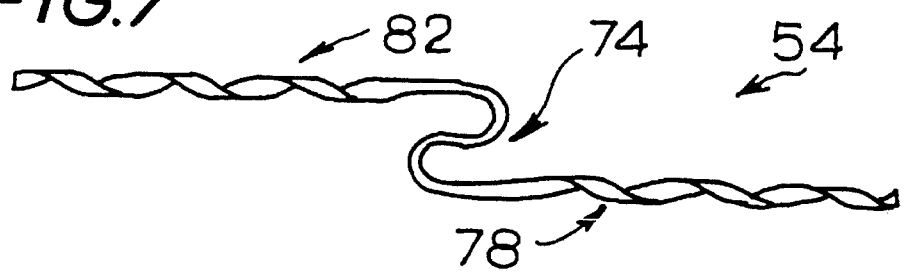
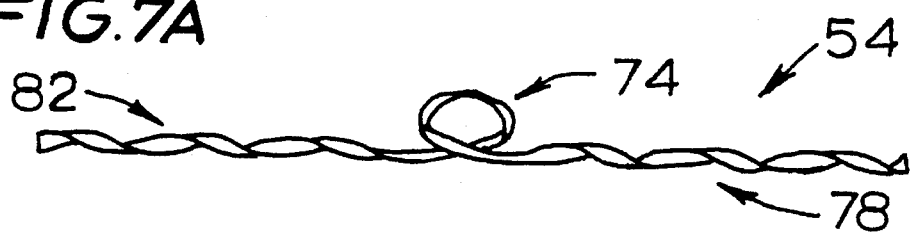
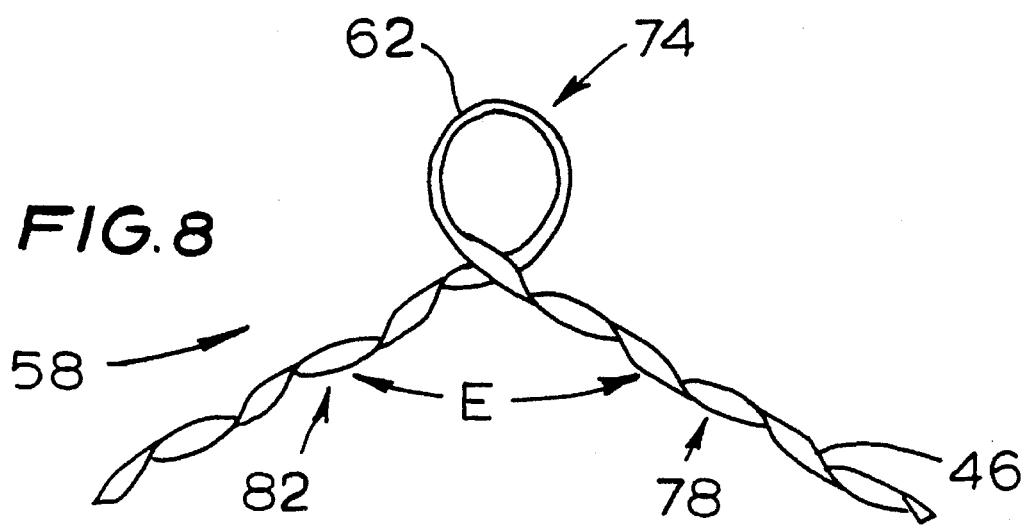

METHODS AND APPARATUS FOR MANUFACTURING HELICAL PRODUCTS

FIELD OF THE INVENTION

This invention relates to methods and apparatus for manufacturing helical products (including but not limited to insulator ties and dead-ends) and to such products themselves.

BACKGROUND OF THE INVENTION

Conventional helical products such as dead-ends and insulator ties typically consist of sets of wire strands. After the individual strands are formed, they are spiralled and then glued together to form the stranded sets. In many cases grit is then sprayed onto the glued sets to raise their collective coefficient of friction, and portions of each set are thereafter straightened as appropriate to produce the resulting product. This straightening technique can cause the glued strands to detach, however, and the overall forming process is often labor intensive.

U.S. Pat. No. 3,847,491 ("the '491 patent") to Poffenberger discloses other helically preformed dead-ends and "splice-type" appliances for cable and wire installations. According to the '491 patent, the dead-ends may be constructed of either plastic rods or a flat ribbon or strip of material such as steel. Following separate formation of the two helical legs and a U-shaped bight of each dead-end, the three elements are joined by welding or clamping them together. The dead-ends may also contain knurled or gritted surfaces to enhance their ability to grip cables, although no mechanism for knurling the appropriate surfaces is disclosed in either the '491 patent or in U.S. Pat. No. 3,183,658 to which it refers.

U.S. Pat. No. 3,800,397 ("the '397 patent"), also to Poffenberger, addresses a method for making the helical legs and bight of the dead-end. As stated therein, each leg is created by forming an elongated helical strip and then cutting the strip to the desired length. Another continuous strip is formed into "continuous generally sine wave type undulations," with "each individual undulation corresponding to the desired configuration" of the bight of the resulting dead-end. The undulating strip is cut to define multiple bights, one of which may then be joined to the helical legs as noted above to create the dead-end.

As discussed in the '491 and '397 patents, the pitch lengths of the two helical legs differ. In use, the first leg (having longer pitch) is wrapped about a cable, with the second leg thereafter wrapped about both the cable and the first leg. The helixes of the first leg purportedly provide a body of a relatively uniform and more rigid contour for the helixes of the second leg to grip, while the second leg is intended to clamp the surface of the first leg tightly about the cable.

Neither the '491 patent nor the '397 patent contemplates manufacturing both the helical and bight portions of deadends from a continuous strip of material. Similarly, neither patent discloses forming other appliances useful in connection with cable installations or any mechanism for knurling such appliances in-line. The '491 and '397 patents additionally neither teach nor suggest devices having legs of equal pitch length, each intended to wrap around a conductor or other cable. Instead, as discussed therein, the leg of the dead-end of the '491 and '397 patents having the shorter pitch is wrapped around the other leg to diminish excessive localized radial pressures that otherwise purportedly would occur.

SUMMARY OF THE INVENTION

The present invention provides alternative methods and apparatus for forming devices (including dead-ends and insulator ties) primarily from flat strips of material. Unlike those of the '491 and '397 patents, the components of the devices of the present invention may be formed continuously from a single strip rather than separately manufactured. Doing so avoids the need to weld or clamp the components together, reducing the possibility of stresses or non-uniformities forming during their joinder. It also decreases the manual labor often involved in manufacturing existing dead-ends, permitting continuous automatic or semiautomatic manufacture to occur.

Using appropriate guides such as rollers and wheels, the present invention manipulates a continuous flat strip or other suitable material to form both helical and non-helical sections. Feeding the strip initially to a pair of forming rollers, the invention permits devices of differing pitch lengths and helix diameters to be formed by adjusting the angle between the feed and forming axes and the distance between the rollers. Such adjustments can occur automatically, moreover, by connecting the forming rollers to suitable controllers. Thus, although some embodiments of the present invention contemplate forming devices having sections of identical pitch length, the invention is not so limited and may be used to produce devices of variable pitch length and helix diameter. In particular, the present invention is useful in forming insulator ties and other equipment typically associated with conductive cables.

To make a dead-end consistent with the present invention, however, one need merely feed a flat strip of material to a pair of forming rollers or equivalent equipment. After the first helical leg of the dead-end is created, the forming rollers may be deactivated to retain a straight section of the device. During this operation other rollers may be employed to bend, or redirect, the straight section along the same axis as that of the prior helical portion. Alternatively, the first helical leg may simply be bent back to the original feed axis. In either event, maintaining the same axis of travel for both the helical and non-helical sections of the device prevents it from effectively becoming a giant flywheel as it rotates during the forming process.

The forming rollers are thereafter reactivated to form the second helical leg of the device, and a cutting mechanism may be used to separate adjacent devices. The straight section of the strip subsequently is manually or automatically bent to form the bight of the completed dead-end. If a knurled surface is desired for the dead-end, it may be formed in-line using a knurling wheel actuated hydraulically or otherwise.

It is therefore an object of the present invention to provide methods and apparatus for forming devices including dead-ends and insulator ties from flat strips or other suitable materials.

It is another object of the present invention to provide devices formed of continuous segments of the strip, avoiding the need to weld, clamp, or otherwise join their component parts.

It is a further object of the present invention to provide equipment capable of manipulating a continuous flat strip of material to form both helical and non-helical sections.

It is yet another object of the present invention to provide apparatus in which adjustable forming rollers are adapted to vary the pitch length and helix diameter of the resulting devices.

It is also an object of the present invention to provide rollers that redirect a straight section of a strip along the same axis as that of a prior helical portion.

It is additionally an object of the present invention to provide an in-line wheel or other suitable mechanism for knurling a surface of the flat strip.

Other objects, features, and advantages of the present invention will become apparent with reference to the remainder of the written portion and the drawings of the application.

BRIEF DESCRIPTION OF THE DRAWINGS

FIG. 4 is a plan view of redirection rollers of the apparatus of FIG. 1 shown engaging a straight section of a device having both straight and helical sections.

FIG. 5 is a plan view of the redirection rollers shown engaging a helical section of the device of FIG. 4.

FIG. 6 is a side elevational view of a dead-end of the present invention.

FIGS. 7 and 7A are, respectively, top plan and side elevational views of an insulator tie of the present invention.

FIG. 8 is a front elevational view of another insulator tie of the present invention.

DETAILED DESCRIPTION

Figure 1:
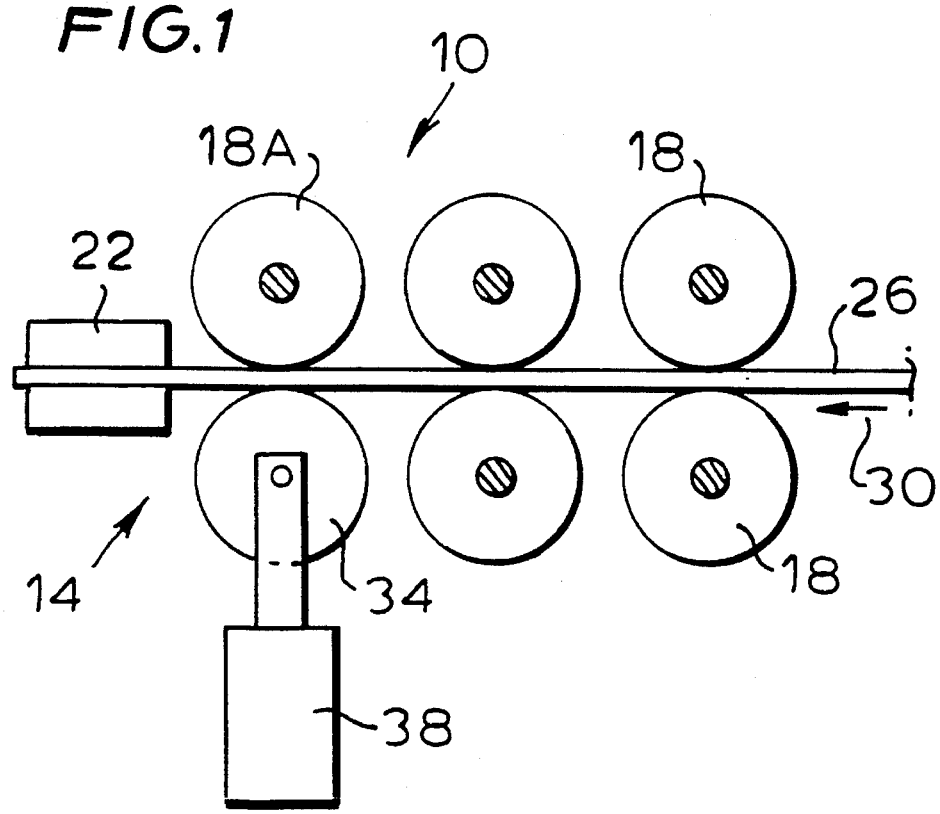
FIG. 1 is a schematic representation of apparatus of the present invention with a knurling wheel activated.
Figure 2:
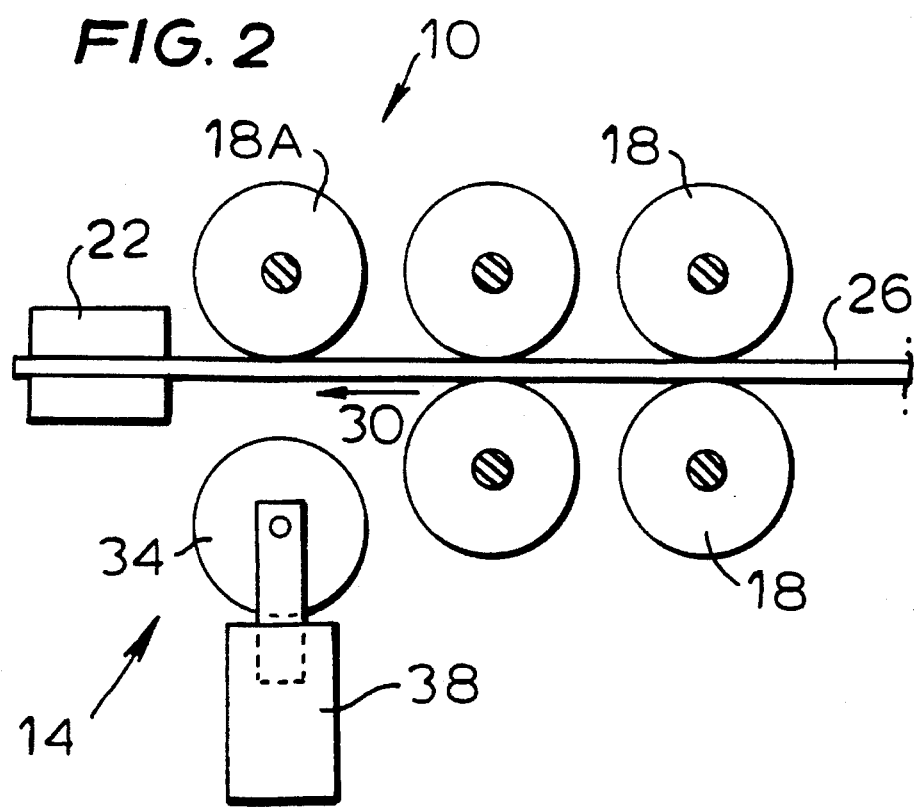
FIG. 2 is a schematic representation of the apparatus of FIG. 1 with the knurling wheel deactivated.

FIGS. 1–2 illustrate schematically apparatus 10 of the present invention. Apparatus 10 includes drive section 14, comprising one or more pairs of opposed drive wheels 18, and guides 22. The design of drive section 14 permits material 26, typically (but not necessarily) a flat strip of metal, to pass therethrough in the direction of feed arrow 30. Appropriate positioning of the drive wheels 18 and guides 22 reduce the likelihood that material 26 will buckle or otherwise deform when fed to apparatus 10. Guides 22 also may be used to straighten material 26 in one or more dimensions, thereby reducing warps and curves that might otherwise be present.

Because material 26 is useful in connection with cable and wire installations, knurling of at least portions of its surface may be desired. As detailed in the schematic representations of FIGS. 1–2, this knurling may be accomplished by including in apparatus 10 a retractable knurl wheel 34. In FIG. 1, knurl wheel 34 is shown contacting material 26, producing thereon knurls suitable to enhance the grip of material 26 about a cable or other object. In FIG. 2, by contrast, knurl wheel 34 is retracted so as not to contact material 26.

As illustrated in FIGS. 1–2, knurl wheel 34 may be attached to hydraulic cylinder 38 to permit such retraction. Those skilled in the art will recognized, however, that pneumatic cylinders or other actuators may be used to move knurl wheel 34 relative to material 26. Similarly, although knurl wheel 34 is shown schematically opposite drive wheel 18A and intermediate drive wheels 18 and guides 22, it may be positioned elsewhere as necessary or appropriate to achieve the sought after results.

Figure 3:
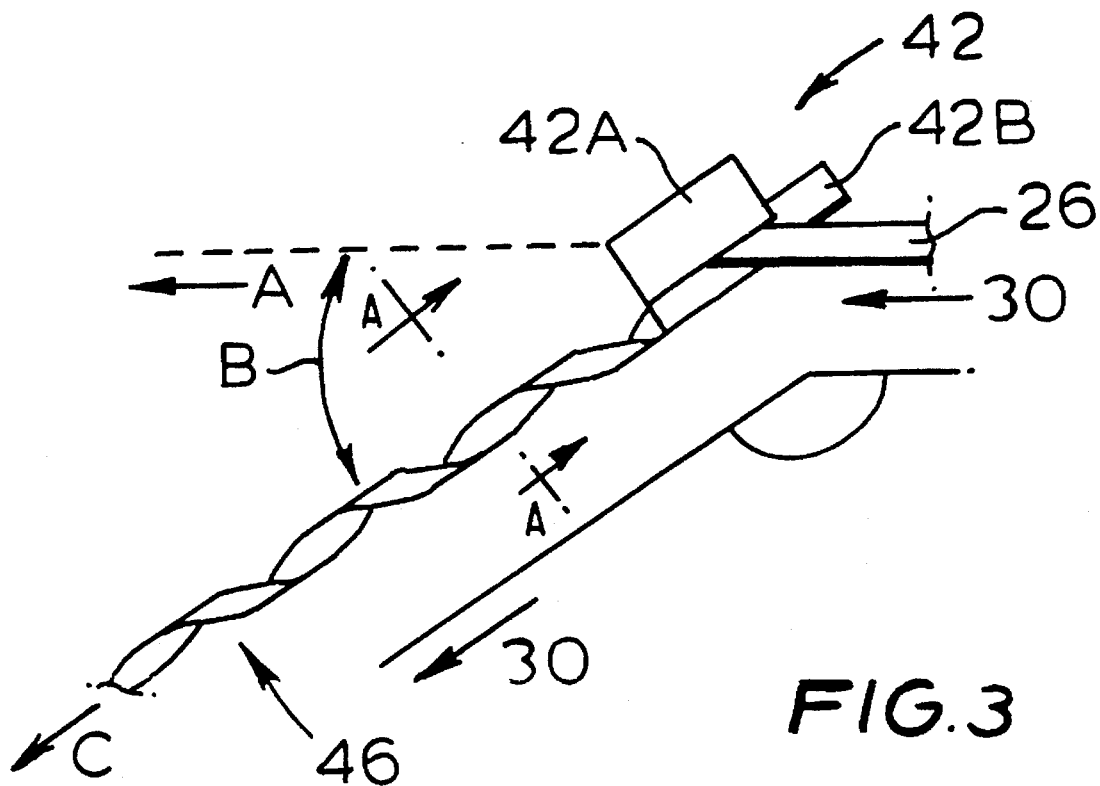
FIG. 3 is a plan view of forming rollers of the apparatus of FIG. 1.
Figure 3A:
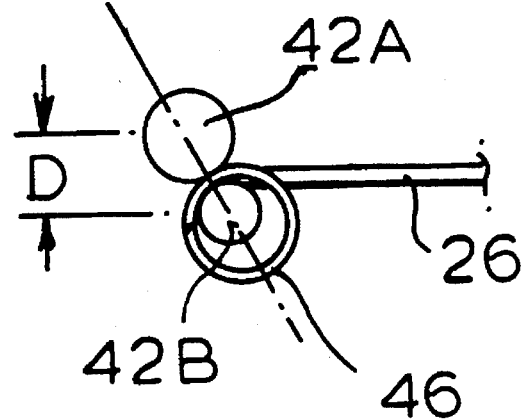
FIG. 3A is a cross-sectional view of the forming rollers taken along line A—A of FIG. 3.

Throughout drive section 14, material 26 (albeit possibly knurled) remains flat. Upon exiting guides 22, however, material 26 encounters forming section 42, illustrated in FIGS. 3 and 3A as including top forming roller 42A and bottom forming roller 42B having longitudinal axis C. Like knurling wheel 34, forming rollers 42A and 42B are retractable and thus may be deactivated when desired. Alternatively, forming section 42 may comprise a single top forming roller 42A, with bottom forming roller 42B replaced by a support or, perhaps, the trailing edge or portion of guides 22.

When activated, forming rollers 42A and 42B impart a helical shape unto the material 26 passing therethrough. Because the distance D between forming rollers 42A and 42B determines the diameter of helix 46 formed in material 26, helixes of different diameters may be formed merely by adjusting that distance D. Rollers 42A and 42B simultaneously change the direction of travel of material 26 by an angle B, causing material 26 to range along longitudinal axis C rather than the original feed axis A. Thus, helixes 46 of different pitch lengths may be created by adjusting the angle B between longitudinal axis C and feed axis A. By connecting forming rollers 42A and 42B to suitable controlling equipment, moreover, such adjustment of distance D and angle B may occur automatically. Moreover, by making angle B negative, helixes 46 having an opposite lay direction may be formed.

The shapes of products such as dead-end 50 and insulator ties 54 and 58 (see FIGS. 6, 7, 7A, and 8) are typically discontinuous. When producing these products, therefore, after helix 46 is formed a non-helical section 62 must be created in material 26. This type of discontinuity illustrates some of the limitations of the techniques described in the '491 and '397 patents, which cannot produce such products from a continuous strip. By contrast, FIG. 4 of the present invention shows maintenance of a straight section as non-helical section 62, created by deactivating forming rollers 42A and 42B and continuing to pass material 26 through forming section 42.

Although non-helical section 62 may be formed in the manner of the preceding paragraph, doing so would cause helix 46 of material 26 to act like a flywheel as it rotated. Accordingly, apparatus 10 of the present invention may also include redirection rollers 66A and 66B. Of differing diameters, opposed rollers 66A and 66B bend, or guide, non-helical section 62 along longitudinal axis C. Alternatively, helix 46 could simply be bent back to the original feed axis A.

Like forming rollers 42A and 42B, redirection rollers 66A and 66B are retractable, permitting them to be employed as necessary during operation of apparatus 10. Those skilled in the pertinent art will recognize that servo motors, hydraulics, pneumatics, or any other suitable mechanism may be used to retract and reactivate any or all of forming rollers 42A and 42B and redirection rollers 66A and 66B. Material 26 typically does not advance through apparatus 10 while such retractions and reactivations occur, although with existing controllers these actions can be performed almost instantaneously.

Deactivating rollers 66A and 66B and reactivating forming rollers 42A and 42B produces another helix 70. Although the present invention allows formation with greater uniformity of products having helixes 46 and 70 of the same diameter and pitch length, such is not a necessary result of use of apparatus 10. Instead, as discussed above, adjusting the angle B and the distance D between forming rollers 42A and 42B permits helical devices of differing pitch lengths and helix diameters to be formed, with the adjustment occurring automatically (even during formation of a single helix 46 or 70) if desired. The portion of material 26 to be used for a dead-end 50 or an insulator tie 54 or 58 is cut after helix 70 is formed, thereby producing a helical device having non-helical section 62 intermediate helixes 46 and 70 and permitting continuous formation of the next such device.

FIG. 6 illustrates a dead-end 50 of the present invention. Dead-end 50 is formed of a continuous strip of material 26 and comprises helix 46, helix 70, and non-helical section 62. Although generally straight when exiting apparatus 10, non-helical section 62 of dead-end 50 has been curved (either manually or using other equipment) to form bight 74 and so that leg 78 (comprising helix 46) is approximately parallel to leg 82 (comprising helix 70). In the particular dead-end 50 shown in FIG. 6, the pitch length of helixes 46 and 70 is 2 85", while the outer diameter (the sum of the helix diameter and twice the thickness of the flat strip) of each of helixes 46 and 70 is 0.457".

FIGS. 7 and 7A detail an exemplary insulator "top" tie 54 in which non-helical section 62 has been bent into bight 74 in the shape of an "S." Nominal pitch lengths and outer diameters for such a tie may be 5.50" and 1.004", respectively FIG. 8, finally, shows an insulator "side" tie 58 of the present invention. In insulator tie 58, non-helical section 62 has been bent through approximately 300° to form bight 74. This produces a nominal angle E of approximately 120° between legs 78 and 82. Exemplary pitch lengths and outer diameters for helixes 46 and 70 of tie 58 are, respectively, 4.00" and 0.683".

In use, legs 78 and 82 typically wrap around a conductor or other cable to grip it securely. If present, the knurled surfaces of legs 78 and 82 may enhance the grip and thereby provide an even more effective product. As noted above, the helical products of the present invention may be formed of a continuous strip of material (whether flat, round, or otherwise) and are not limited to two-legged devices such as dead-ends and insulator ties. Instead, the invention contemplates production of virtually any elongated device intended to have one or more discontinuities along its length. Thus, although the foregoing is provided for purposes of illustrating, explaining, and describing embodiments of the present invention, modifications and adaptations to these embodiments will be apparent to those skilled in the art and may be made without departing from the scope or spirit of the invention.

What is claimed is:

1. A method of producing a helical device having legs and a bight, comprising the steps of:
   a. providing along a first axis an elongated flat strip of material having integrally-formed formed first, second, third, and fourth sections, the first and third sections defining the legs of the device and the second section defining the bight;
   b. be knurling the material;
   c. passing the first section through adjustable forming rollers to form the first section in the shape of a helix, which forming rollers are separated by a predetermined distance and at least one of which forming rollers defines a longitudinal axis along which the first section travels while being formed in the shape of a helix, the distance between the forming rollers determining the diameter of the helix and the angle between the first axis and the longitudinal axis determining the pitch length of the helix;
   d. bending the second section along the longitudinal axis;
   e. passing the third section through adjustable forming rollers to form the third section in the shape of a helix;
   f. cutting the material between the third and fourth sections; and
   g. thereafter bending the second section.

2. A method according to claim 1 further producing a second helical device having a leg defined by the fourth section and further comprising the step of passing the fourth section through adjustable forming rollers to form the fourth section in the shape of a helix.

3. A method according to claim 1 further comprising the step of adjusting the distance between the forming rollers to change the diameter of the helix in which the first section is shaped.

4. A method according to claim 1 further comprising the step of adjusting the angle between the first axis and the longitudinal axis to change the pitch length of the helix in which the first section is shaped.

5. Apparatus for producing a helical device having integrally-formed first, second, and third sections from an elongated strip having three integral portions corresponding to the first, second, and third sections, the apparatus comprising:
   a. means for guiding the strip in a first direction of travel; and
   b. be means, comprising a pair of adjustable rollers positioned at a predetermined distance, for
      i. redirecting the first portion of the strip along a second direction of travel and simultaneously forming a first portion of the strip in the shape of a helix, the distance between the adjustable rollers determining the diameter of the helix and the angle between the first and second directions of travel determining the pitch length of the helix; and
      ii. forming the third portion of the strip in the shape of a helix, the first and third portions of the strip being separated by a second non-helical portion of the strip.

6. Apparatus according to claim 5 further comprising means for selectively knurling portions of the strip.

* * * * *

UNITED STATES PATENT AND TRADEMARK OFFICE
CERTIFICATE OF CORRECTION

PATENT NO. : 5,586,461
DATED : December 24, 1996
INVENTOR(S) : Maurice W. Murphy It is certified that error appears in the above-indentified patent and that said Letters Patent is hereby corrected as shown below:

Column 6, line 4, after b. delete "be"

Column 6, line 43, after b. delete "be"

Signed and Sealed this

Sixth Day of May, 1997

Attest:

BRUCE LEHMAN

Attesting Officer *Commissioner of Patents and Trademarks*